United States Patent [19]

Bloom

[11] 3,931,807

[45] Jan. 13, 1976

[54] ROTARY INTERNAL ENGINES

[76] Inventor: Abraham Bloom, 721 Arlington Ave., Plainfield, N.J. 07060

[22] Filed: Dec. 3, 1973

[21] Appl. No.: 421,100

[52] U.S. Cl. .............. 123/8.05; 123/8.27; 123/8.31
[51] Int. Cl.² ......................................... F02B 53/00
[58] Field of Search ....... 123/8.27, 8.31, 8.45, 8.05; 418/232, 239, 248

[56] References Cited
UNITED STATES PATENTS 3,797,464   3/1974   Abbey................................ 123/8.27

FOREIGN PATENTS OR APPLICATIONS 528,714   11/1940   United Kingdom................. 123/8.27
520,875   5/1940    United Kingdom................. 418/248
1,093,421 5/1955    France............................... 123/8.27

Primary Examiner—C. J. Husar
Assistant Examiner—O. T. Sessions
Attorney, Agent, or Firm—Lerner, David, Littenberg & Samuel

[57] ABSTRACT

An improved rotary internal combustion engine utilizing a new and improved cycle of operation which includes six phases: intake, compression, combustion, after burn, adiabatic expansion, and exhaust. The purpose of both the after burn phase and the adiabatic expansion phase is to increase the thermodynamic efficiency of the engine and also to reduce the pollution products of the exhaust. The after burn phase achieves this purpose by injecting jets of hot compressed air into the hot combustion phase products at the end of the combustion phase and thus promotes more complete combustion. The adiabatic expansion phase serves to increase the engine efficiency by substantially allowing the combustion products to expand inside the engine thus converting the heat energy into useful mechanical energy.

8 Claims, 18 Drawing Figures

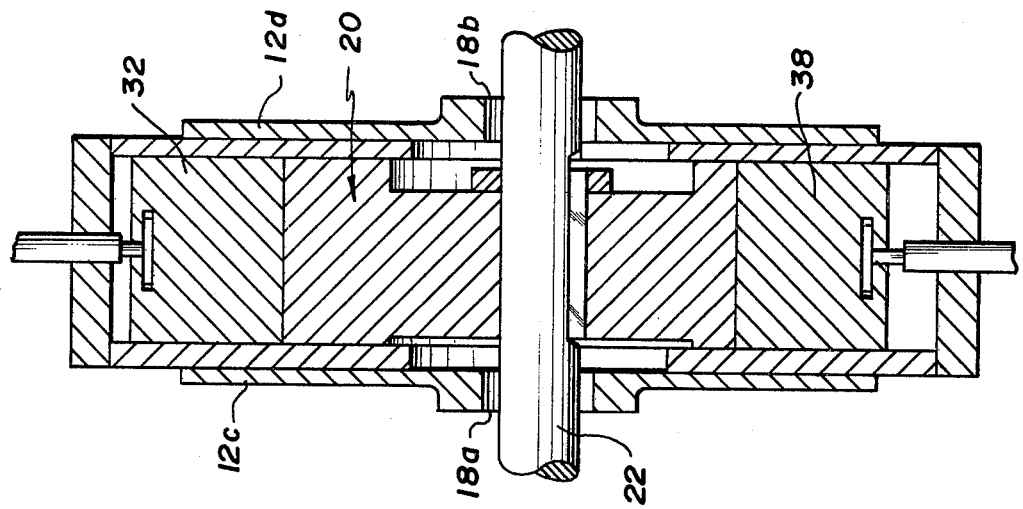
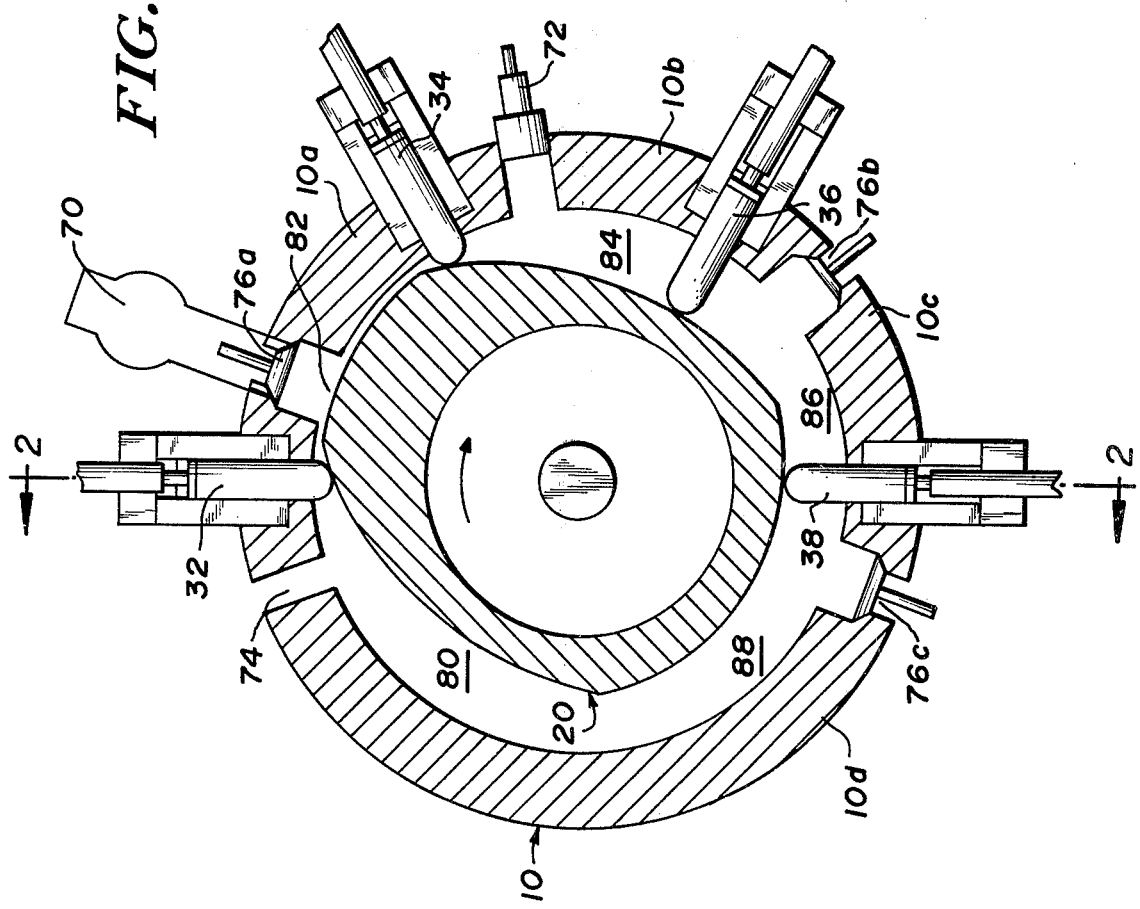

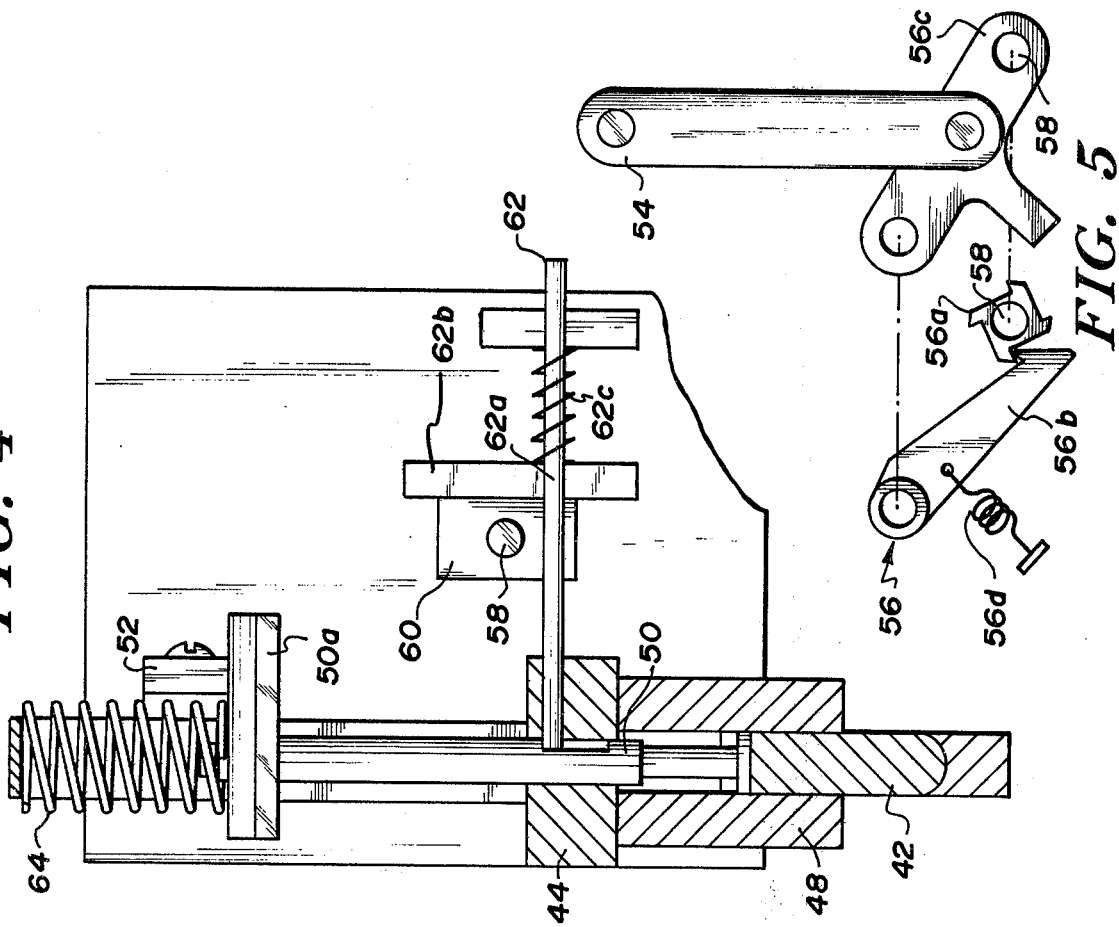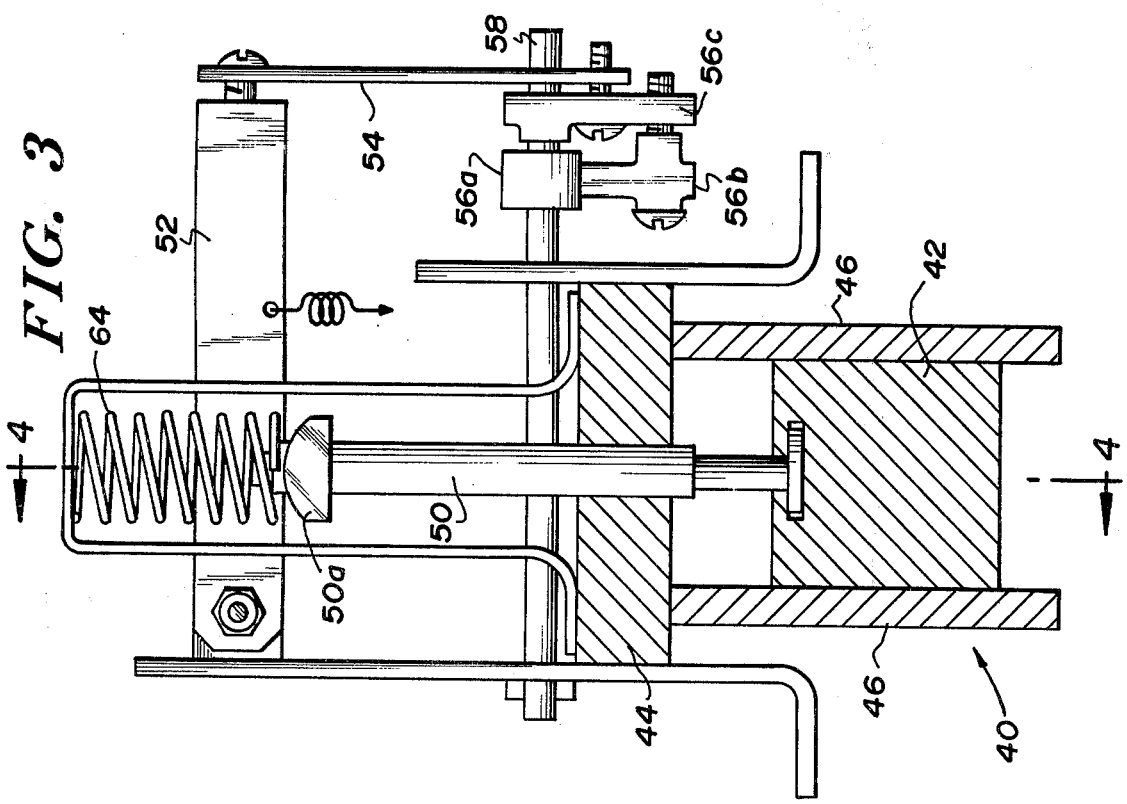

ROTARY INTERNAL ENGINES

The invention provides a rotary internal combustion engine in which the force of combustion is applied directly to a rotating cam called the rotor. Also provided is a stator in which the rotor rotates, and a plurality of cam riders called sliding abutments. These sliding abutments divide the space between the rotor and stator into a plurality of working chambers. The rotation of the rotor is designed to vary the volume of the working chambers between a predetermined minimum and a predetermined maximum as it rotates.

The object of the invention is to provide an improved rotary internal combustion engine utilizing a new and improved cycle of operation. Conventional engines, whether piston or rotary, generally utilize a four-phase cycle including intake, compression, combustion, and exhaust phases. There is provided herein a six-phase cycle which includes intake, compression, combustion, after burn, adiabatic expansion, and exhaust phases.

To accomplish this with a conventional piston engine or rotary engine would probably be impossible. However, with the rotary engine herein described, the use of the six-phase cycle not only becomes possible but is relatively simple and inexpensive to manufacture.

One form of the invention is illustrated in the accompanying drawings.

FIG. 1 is a cross-sectional view showing the relationship of stator 10, rotor 20, and sliding abutments 30.

FIG. 2 is a sectional view taken along line 2—2.

FIG. 3 is a cross-sectional view illustrating the details of sliding abutments 30 and the associated hold-release mechanisms 40.

FIG. 4 is a sectional view taken along line 4—4 of FIG. 3.

FIG. 5 is a perspective view of the ratchet assembly.

Figure 7:
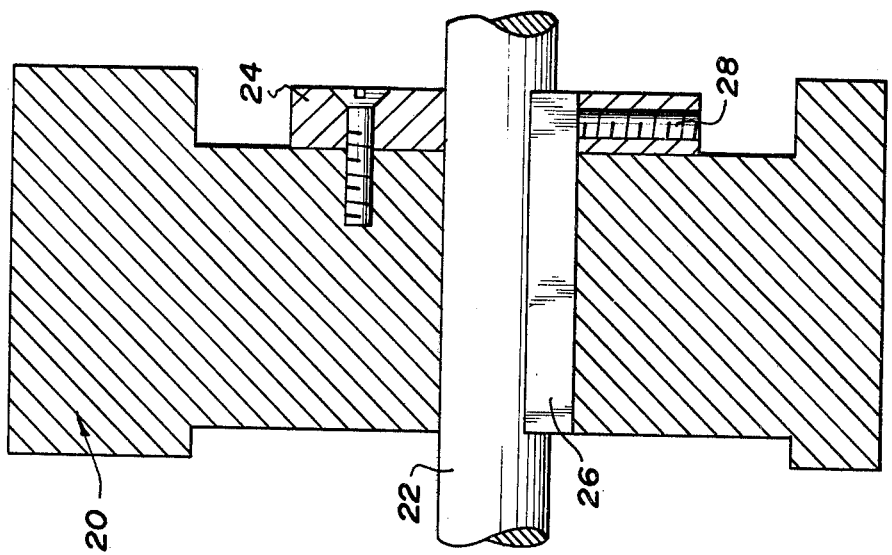
FIG. 7 shows a section of rotor 20.

No methods of cooling or lubrication are shown, nor is the ignition circuit shown, as these will depend upon the particular use and application of the individual engine, and are well known in the art.

Stator 10 includes circumferential blocks 10a, 10b, 10c, and 10d; slotted inner liner plates 12a, 12b; outer plates 12c, 12d; gaskets 14a, 14b; pressure equalizing slots 16 formed in 10a, 10b, and 10c; and rotor shaft bushings 18a, 18b.

Rotor 20 includes rotor shaft 22, set screw plate 24, key 26, and set screw 28.

Sliding abutments 30 include first sliding abutment 32, second sliding abutment 34, third sliding abutment 36, and fourth sliding abutment 38. A hold-release mechanism 40 is associated with only sliding abutments 34, 36, and 38, as abutment 32 continuously engages rotor 20.

Also provided are a carburetor 70, a spark plug 72, an exhaust port 74, and intake ports with check valves 76a, 76b, and 76c.

Figure 6:
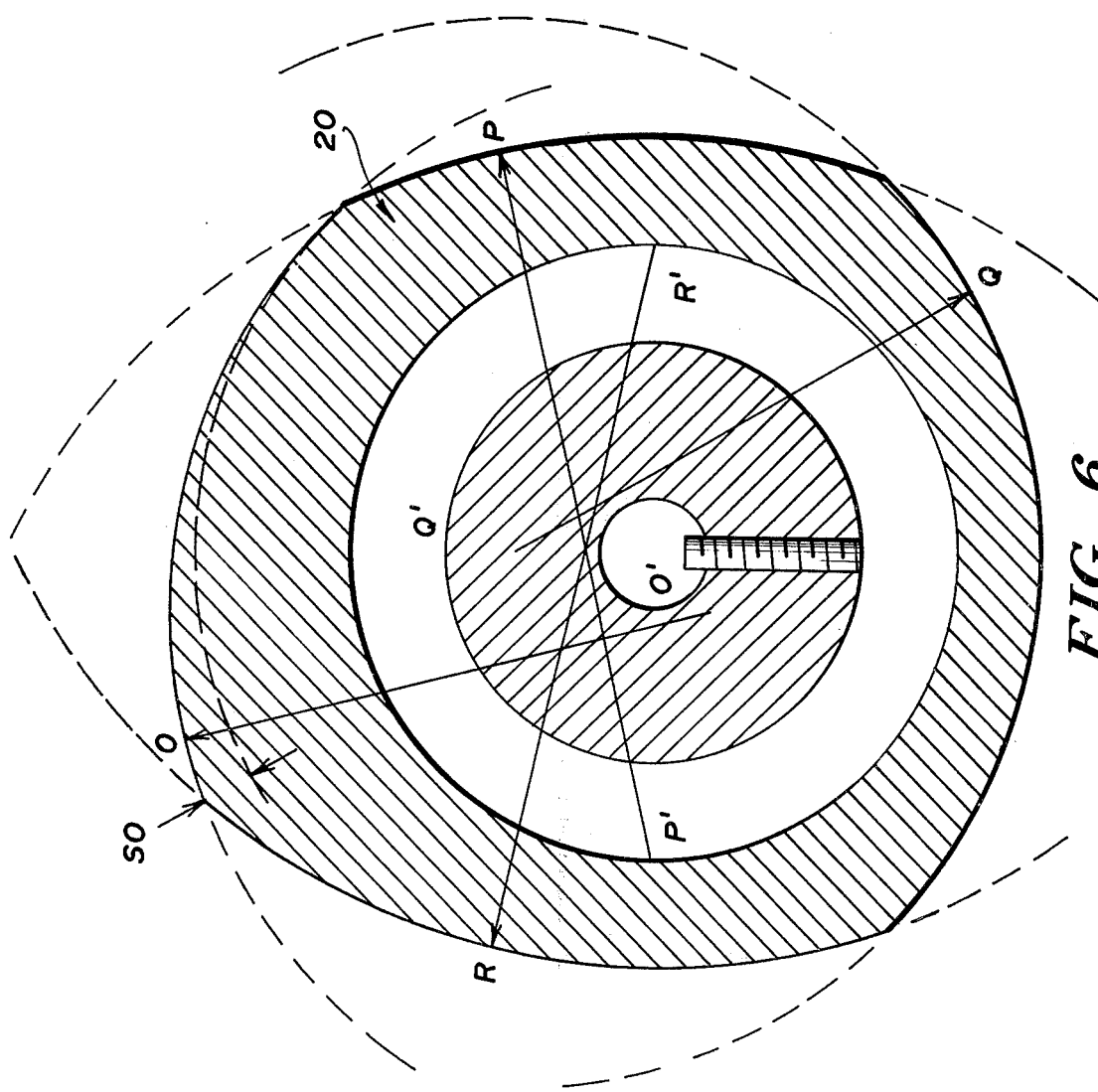
FIG. 6 shows details of construction of rotor 20.
Figure 9:
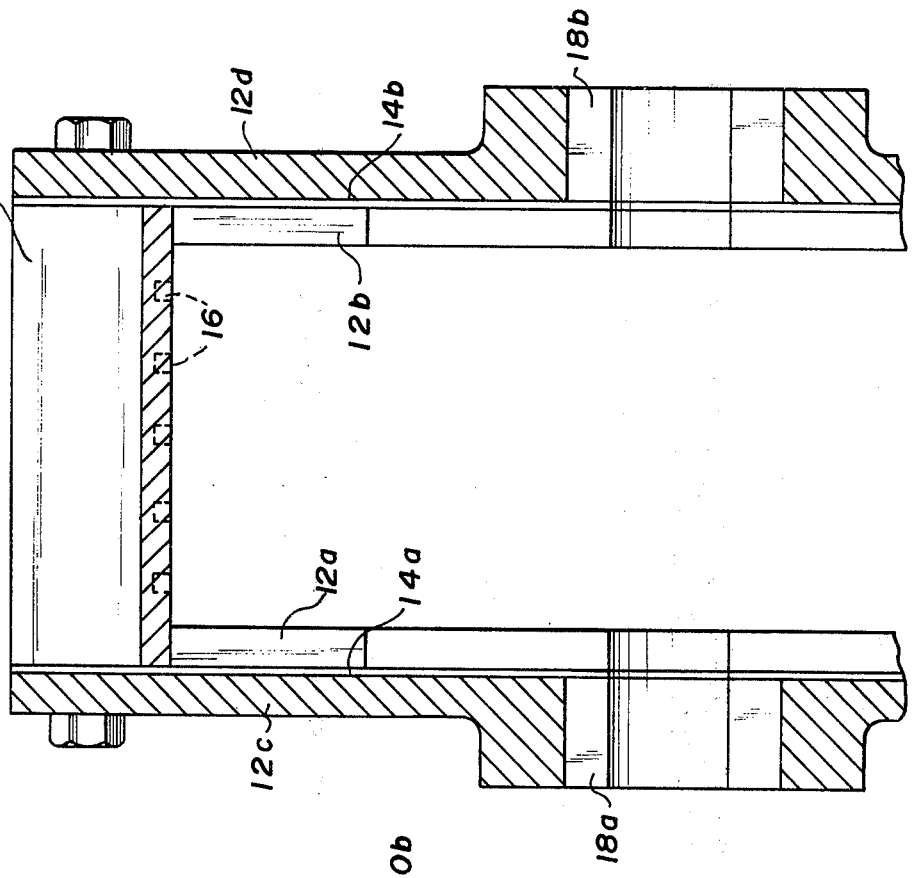
FIGS. 8 and 9 show details of construction of stator 10.
Figure 8:
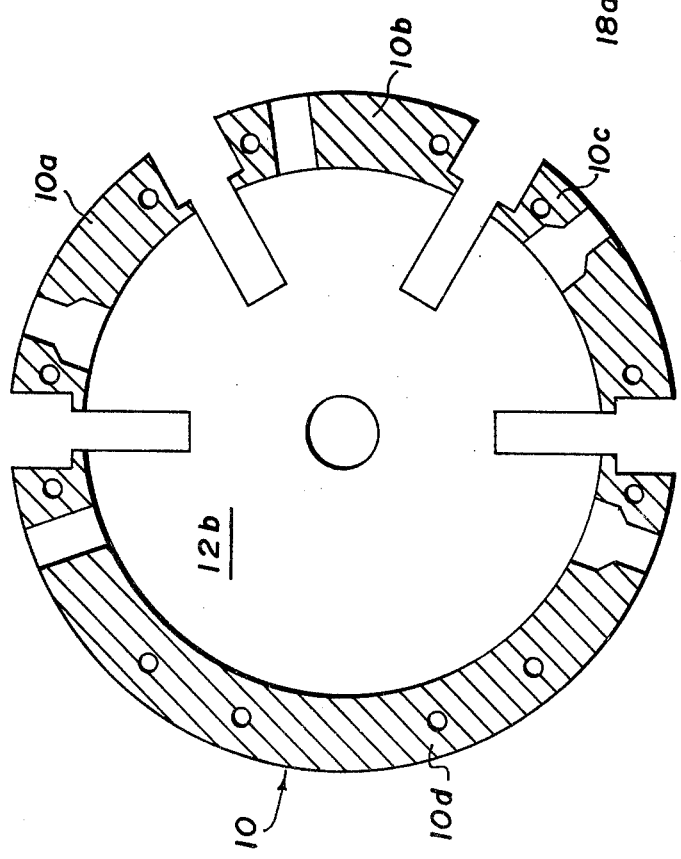
Figure 10:
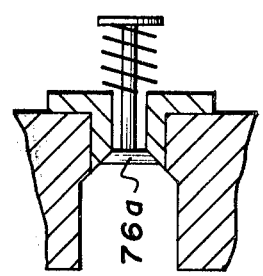
FIG. 10 shows a typical check valve.

The rotor 20 is a cam designed, as shown in FIGS. 6 and 7, to vary the volume of the working chambers between a predetermined minimum and a predetermined maximum as the rotor rotates. In order to obtain high efficiency, it is necessary to machine the outer rotor surface as well as the sides of the rotor with precision to provide a smooth finish. In order to facilitate the machining, the surface of the rotor consists of four segments in the form of arcs O, P, Q, and R. The center of each arc is located so that the machining of each arc will not interfere with the surfaces of the other arcs. As shown in FIG. 6, arc O is machined from a center O', arc P from a center P', arc Q from a center Q', and arc R from a center R'. The center O' is offset from the center lines in order to give arc O the slope SO. It is this slope that provides the motion that actuates the hold-release mechanisms 40.

The space 80 between rotor 20 and stator 10 is divided into a plurality of working chambers by the spring-loaded, sliding abutments 32, 34, 36, and 38. The working chambers are noted as 82, 84, 86, and 88. As rotor 20 rotates relative to stator 10, the working chambers will vary in volume between a predetermined minimum and a predetermined maximum. The clearance or space 80 between rotor 20 and stator 10 should be as small as possible. In order to allow the pressure in working chambers 82, 84, and 86 to equalize, the blocks 10a, 10b, and 10c include pressure equalizing slots 16. These slots are omitted in block 10d.

In order to obtain the desired six-phase cycle, a hold-release mechanism 40 is associated with each of the sliding abutments 34, 36, and 38. As shown in FIGS. 3, 4, and 5, hold-release mechanism 40 includes the following: sliding abutment 42; a sliding abutment operating chamber or pod composed of top block 44; end guides 46 and side plates 48; a notched push rod 50; a push rod T head 50a; a lever 52; a lever link 54; a ratchet assembly 56 including a four-tooth ratchet wheel 56a; pawl 56b; associated lever 56c and a spring 56d; a shaft 58; a rectangular-shaped cam 60; a holding pin assembly 62 including a holding pin 62a, block 62b, and a spring 62c; and a main loading spring and retainer 64.

Sliding abutments 34, 36, and 38 are identical. Sliding abutment 32 is similar in every respect except hold-release mechanism 40 is eliminated as sliding abutment 32 is adapted to be in continuous sealing engagement with the rotor 20.

Each hold-release mechanism 40 functions as follows: When sliding abutment 42 and associated notched push rod 50 approach top of stroke, push rod T head 50a actuates successively lever 52, lever link 54 and ratchet assembly 56. This results in a 90° rotation of shaft 58 and rectangular cam 60. As cam 60 rotates between its short axis and its long axis, holding pin 62a moves out of or into the notch in push rod 50, thus providing the alternate hold-release action. In the "hold" position, the sliding abutment is held out of engagement with rotor 20 on alternate revolutions of rotor 20; and in the "release" position, the sliding abutment is held in engagement with rotor 20 on alternate revolutions of rotor 20.

Referring to FIGS. 11 to 18, following is an explanation of the six-stroke cycle as applied herein, said cycle including intake, compression, combustion, after burn, adiabatic expansion, and exhaust phases. In order to achieve the six-phase cycle, it is necessary for the rotor to make two full revolutions in each cycle. The proper position of each sliding abutment 34, 36, and 38 is achieved by means of the associated hold-release mechanisms 40. Each mechanism 40 alternately holds its respective sliding abutment in the hold position and on the next revolution of rotor 20, the sliding abutment is released to its release position so that it engages the rotor 20.

FIRST REVOLUTION OF ROTOR 20 (FIGS. 11 TO 14)

Figure 11:
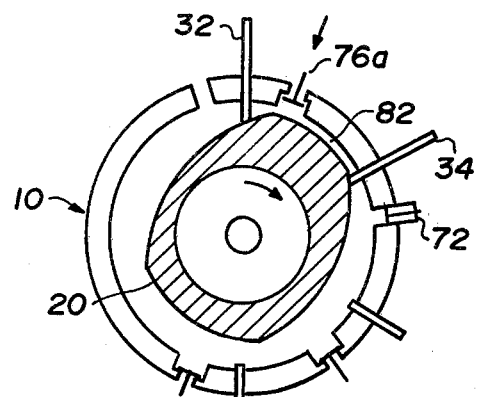
FIGS. 11 through 18 show the phases of the six-phase cycle diagramatically and are explained below.

All working chambers 82, 84, 86, and 88 are in intake phase as follows:

FIG. 11: As rotor 20 sweeps through chamber 82, a charge of fuel and air is drawn into chamber 82 from carburetor 70 through intake port 76a.

Figure 12:
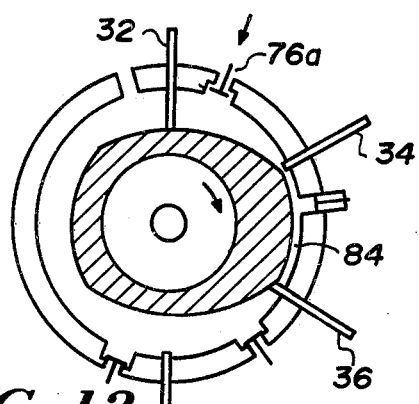

FIG. 12: As rotor sweeps through chamber 84, sliding abutment 34 is in "hold" position. In effect, chambers 82, 84 become one so that chamber 84 receives the charge of fuel and air from chamber 82. Sliding abutments 36 and 38 are in their "hold" positions.

Figure 13:
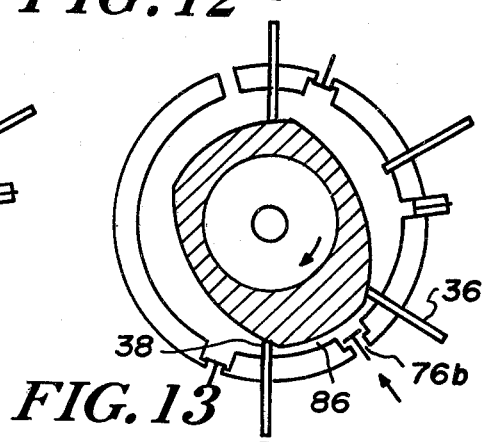

FIG. 13: As rotor sweeps through chamber 86, a charge of air is drawn into chamber 86 through intake port 76b.

Figure 14:
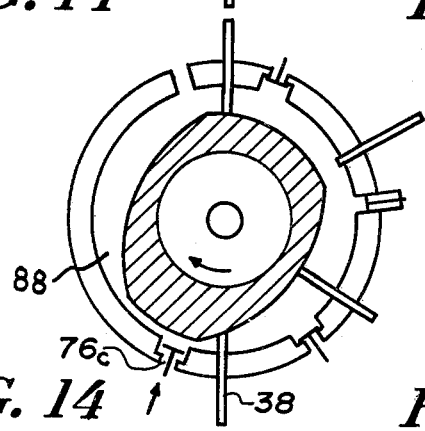

FIG. 14: As rotor sweeps through chamber 88, a charge of air is drawn into chamber 88 through intake port 76c.

Thus, chambers 82, 84 now contain a charge of fuel and air, and chambers 86, 88 now contain a charge of air.

SECOND REVOLUTION OF ROTOR 20 (FIGS. 15 TO 18)

Figure 15:
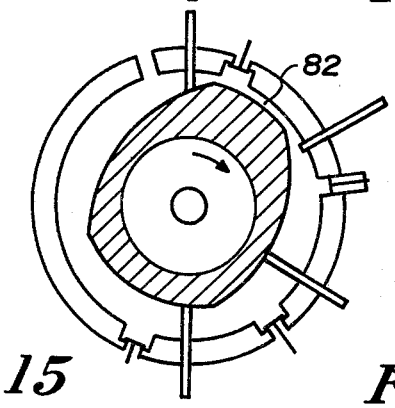

FIG. 15: As rotor sweeps through chamber 82, the fuel and air charge is forced into chamber 84.

Figure 16:
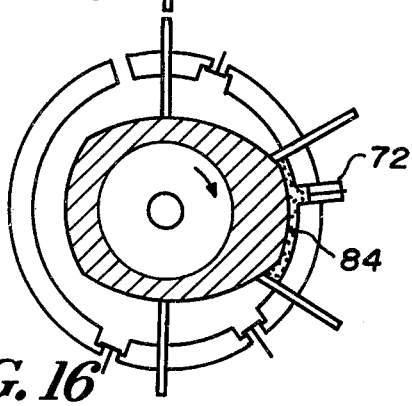

FIG. 16: Sliding abutment 34 is in "release" position, and chamber 84 is now sealed off. As soon as rotor is in the position shown, the engine enters the compression phase. A spark is produced by spark plug 72, and this results in the combustion phase and power as the rotor sweeps through chamber 84.

Figure 17:
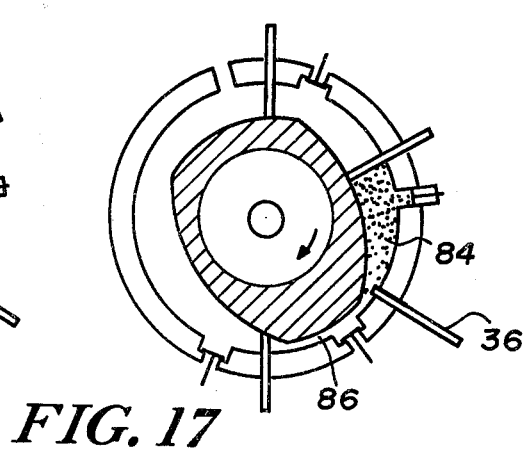

FIG. 17: Sliding abutment 36 is now in "hold" position. As rotor 20 sweeps through chamber 86, the air in chamber 86 combines with the hot contents of chamber 84 providing the after burn phase.

Figure 18:
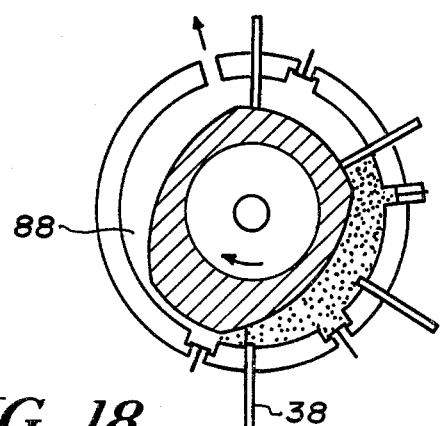

FIG. 18: Sliding abutment 38 is now in "hold" position. As rotor sweeps through chamber 88, chambers 84, 86, and 88 are in effect one chamber. Consequently, the contents of chambers 84, 86 expand into chamber 88. This results in the adiabatic expansion phase of the cycle. As the rotor completes its sweep through chamber 88, exhaust port 74 is cleared and the exhaust phase takes place.

Thus, the six-phase cycle will repeat with each succeeding two revolutions of rotor 20.

In the form of the invention herein illustrated, one rotor and associated mechanism is shown. In order to obtain more power and flexibility, a plurality of rotors and associated mechanisms can be operated in unison.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

I claim:

1. A rotary internal combustion engine designed to operate on a six-phase cycle which includes intake, compression, combustion, after burn, adiabatic expansion, and exhaust phases; said engine comprising a stator, a rotor mounted for rotation within said stator and defining a space therebetween, said rotor having a substantially semi-elliptical cross section, a shaft on which said rotor is mounted for rotation of said rotor relative to said stator, said shaft being mounted for concentric rotation relative to said stator, four spring-loaded, sliding abutments dividing said space into four working chambers, the volume of said four working chambers varying between a predetermined minimum and a predetermined maximum as said rotor rotates, said four working chambers including:

a. a first working chamber serving as an intake chamber and including a fuel-air mixture intake port and an associated check valve, a first one of said spring-loaded, sliding abutments mounted for continuous sealing engagement with said rotor and being located at the leading end of said first working chamber;

b. a second working chamber serving as a combustion chamber and including an opening adapted to receive a spark plug, a second one of said spring-loaded, sliding abutments being arranged to separate said first and second working chambers;

c. a third working chamber serving as an after burn chamber and including an air-intake port and an associated check valve, a third one of said spring-loaded, sliding abutments being arranged to separate said second and third working chambers;

d. a fourth working chamber serving as an adiabatic expansion chamber and including an air-intake port and an associated check valve, and an exhaust port adapted to act as a common exhaust port for said second, third and fourth chambers, a fourth one of said spring-loaded, sliding abutments arranged to separate said third and fourth working chambers;

e. said second, third and fourth spring-loaded, sliding abutments each having associated therewith an automatic hold-release mechanism operative to automatically hold the associated sliding abutment in a hold position out of engagement with said rotor on alternate revolutions of said rotor and to automatically release the associated sliding abutment into a release position in sealing engagement with said rotor on alternate revolutions of said rotor, said second sliding abutment arranged to be in said hold position when said third and fourth sliding abutments are in said release position during one revolution of said rotor, and said second sliding abutment arranged to be in said release position when said third and fourth sliding abutments are in said hold position during the next revolution of said rotor.

2. An engine in accordance with claim 1 wherein said rotor surface includes four segments each defined as first, second, third, and fourth circular arcs.

3. An engine in accordance with claim 2 wherein the centers of said first and third circular arcs are located on an imaginary line extending radially through the center of said rotor shaft, the center of said third arc being located approximately three-quarters of the distance from the center of said shaft to said first circular arc and the center of said first arc being located approximately three-quarters of the distance from the center of said shaft to said third circular arc.

4. An engine in accordance with claim 2 wherein the center of said second circular arc is located on an imaginary line drawn radially through the center of said rotor shaft at a point that is approximately one-third the distance from said shaft center to said second circular arc.

5. An engine in accordance with claim 2 wherein the center of said fourth circular arc is located on an imaginary line drawn radially through the center of said shaft at a distance from said shaft center slightly greater than the radius of said shaft.

6. An engine in accordance with claim 1 wherein said stator includes inner and outer plates and a plurality of circumferentially-shaped blocks including said ports, said inner and outer plates forming the side walls of said stator and said circumferentially-shaped blocks forming the outer circular surface of said stator, said blocks being arranged so that the distance between said inner plates is substantially equal to the lateral dimension of said rotor.

7. An engine in accordance with claim 1 wherein each of said hold-release mechanisms includes a spring-loaded pin, a rectangular-shaped cam arranged to engage said pin, a ratchet mechanism arranged to rotate said cam, a notched push rod operatively connected to said pin, and said push rod being connected to said sliding abutment, said ratchet mechanism and said rectangular-shaped cam operative to actuate said spring-loaded pin into or out of engagement with said notched push rod on alternate revolutions of said rotor to alternately hold and release said sliding abutment.

8. An engine in accordance with claim 1 wherein each of said hold-release mechanisms includes a spring-loaded push rod and a T-shaped head, said T-shaped head being mounted in a T-shaped notch in said sliding abutment to allow easy movement therebetween.

* * * * *